United States Patent
Olgaard et al.

(10) Patent No.: US 9,825,717 B2
(45) Date of Patent: Nov. 21, 2017

(54) METHOD FOR TESTING A RADIO FREQUENCY (RF) DATA PACKET SIGNAL TRANSCEIVER USING IMPLICIT SYNCHRONIZATION

(71) Applicant: LITEPOINT CORPORATION, Sunnyvale, CA (US)

(72) Inventors: Christian Volf Olgaard, Saratoga, CA (US); Ruizu Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 215 days.

(21) Appl. No.: 14/794,178

(22) Filed: Jul. 8, 2015

(65) Prior Publication Data

US 2017/0012716 A1    Jan. 12, 2017

(51) Int. Cl.
  H04B 17/15    (2015.01)
  H04B 17/29    (2015.01)
  H04L 1/20    (2006.01)

(52) U.S. Cl.
  CPC .............. *H04B 17/15* (2015.01); *H04B 17/29* (2015.01); *H04L 1/20* (2013.01)

(58) Field of Classification Search
  CPC ........................................................ H04L 1/20
  See application file for complete search history.

(56) References Cited

U.S. PATENT DOCUMENTS

| | | | |
|---|---|---|---|
| 6,080,203 A * | 6/2000 | Njinda | G01R 31/31859 703/14 |
| 7,689,213 B2 | 3/2010 | Olgaard et al. | |
| 8,356,223 B1 * | 1/2013 | Azimi | G01R 31/31705 341/100 |
| 8,391,160 B2 | 3/2013 | Olgaard et al. | |
| 8,811,194 B2 | 8/2014 | Olgaard et al. | |
| 9,319,154 B2 * | 4/2016 | Olgaard | H04B 17/00 |
| 2005/0095993 A1 | 5/2005 | Kim et al. | |
| 2008/0287117 A1 | 11/2008 | Olgaard et al. | |
| 2010/0303097 A1 * | 12/2010 | Otani | G09G 5/006 370/474 |
| 2012/0113829 A1 | 5/2012 | Olgaard et al. | |
| 2012/0231745 A1 * | 9/2012 | Gregg | H04B 17/309 455/67.12 |
| 2012/0264377 A1 | 10/2012 | Seelenfreund et al. | |
| 2013/0084852 A1 * | 4/2013 | Duperray | H04B 17/0027 455/425 |
| 2014/0024315 A1 | 1/2014 | Olgaard et al. | |
| 2014/0365832 A1 * | 12/2014 | Neeb | G06F 13/1673 714/43 |
| 2015/0036729 A1 | 2/2015 | Olgaard et al. | |
| 2015/0139023 A1 | 5/2015 | Olgaard et al. | |
| 2015/0192639 A1 | 7/2015 | Olgaard | |

OTHER PUBLICATIONS

Aug. 24, 2016—(WO) International Search Report—App PCT/US2016/034609.

* cited by examiner

*Primary Examiner* — Xavier Swewai Wong
(74) *Attorney, Agent, or Firm* — Banner & Witcoff, Ltd.

(57) ABSTRACT

Method for testing a radio frequency (RF) data packet signal transceiver device under test (DUT) including detecting transitions between RF data packet signal transmission and reception by the DUT, detecting transitions between different RF data packet signal transmission operations by the DUT, and detecting transitions between different RF data packet signal reception operations by the DUT.

21 Claims, 5 Drawing Sheets

METHOD FOR TESTING A RADIO FREQUENCY (RF) DATA PACKET SIGNAL TRANSCEIVER USING IMPLICIT SYNCHRONIZATION

BACKGROUND

The present invention relates to testing of a radio frequency (RF) data packet signal transceiver, and in particular, to testing such a device without explicit or separate synchronization signals.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ testing subsystems for providing test signals to each device under test (DUT) and analyzing signals received from each DUT. Some subsystems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

As features and manufacturing volumes of such devices increase, the time, and therefore, the cost, of testing such devices increases as well. One way to reduce the time and, therefore, the cost, of testing is to reduce the communications between the tester, or testing system, and the DUT that are not related to directly producing test results. One approach to this has been to program or otherwise embed within both the tester and DUT predetermined sequences of testing steps (e.g., pre-loaded in firmware) and provide synchronization between the tester and DUT to ensure that proper testing steps are followed as desired. Such synchronization can be achieved during brief intervals of explicit synchronization communications between the tester and the DUT. Examples of these can be found in U.S. Pat. Nos. 7,689,213 and 8,811,194, the disclosures of which are incorporated herein by reference.

However, it would be desirable to further minimize, or even eliminate, such requirements of intervals, however brief, of explicit synchronization communications, since such synchronization communications complicate design and execution of the test flow, and do not directly produce or result in test results.

SUMMARY

In accordance with the presently claimed invention, a method is provided for testing a radio frequency (RF) data packet signal transceiver device under test (DUT) including detecting transitions between RF data packet signal transmission and reception by the DUT, detecting transitions between different RF data packet signal transmission operations by the DUT, and detecting transitions between different RF data packet signal reception operations by the DUT.

In accordance with one embodiment of the presently claimed invention, a method for testing a radio frequency (RF) data packet signal transceiver device under test (DUT) including detecting a transition between RF data packet signal transmission and reception by the DUT includes:
 receiving, with a tester from a DUT, a first DUT data packet signal including earlier and later portions of a first plurality of DUT data packets;
 capturing, with the tester, one or more DUT data packets among the later portion of the first plurality of DUT data packets, followed by
 transmitting, from the tester, a tester data packet signal including a plurality of tester data packets with alternating portions having respective durations of mutually higher and lower nominal transmitted tester data packet signal powers, and
 receiving, with the tester from the DUT, a second DUT data packet signal including a second plurality of DUT data packets with alternating portions related to respective ones of the alternating portions of the plurality of tester data packets; and
 terminating the transmitting of the tester data packet signal, followed by receiving, with the tester from the DUT, a third DUT data packet signal including a third plurality of DUT data packets.

In accordance with another embodiment of the presently claimed invention, a method for testing a radio frequency (RF) data packet signal transceiver device under test (DUT) including detecting a transition between RF data packet signal transmission operations by the DUT includes:
 receiving, with a tester from a DUT, a first DUT data packet signal including earlier and later portions of a first plurality of DUT data packets;
 capturing, with the tester, one or more DUT data packets among the later portion of the first plurality of DUT data packets;
 receiving, with the tester from the DUT, a second DUT data packet signal subsequent to the first DUT data packet signal and including earlier and later portions of a second plurality of DUT data packets; and
 capturing, with the tester, one or more DUT data packets among the later portion of the second plurality of DUT data packets.

In accordance with another embodiment of the presently claimed invention, a method for testing a radio frequency (RF) data packet signal transceiver device under test (DUT) including detecting a transition between RF data packet signal reception operations by the DUT includes:
 transmitting, from the tester, a first tester data packet signal including a first plurality of tester data packets with alternating portions having respective durations of mutually higher and lower nominal transmitted tester data packet signal powers;

receiving, with the tester from a DUT, a first DUT data packet signal including a first plurality of DUT data packets with alternating portions related to respective ones of the alternating portions of the first plurality of tester data packets;

detecting a cessation of the first DUT data packet signal, followed by terminating the transmitting of the first tester data packet signal;

transmitting, from the tester, a second tester data packet signal subsequent to the first tester data packet signal and including a second plurality of tester data packets with alternating portions having respective durations of mutually higher and lower nominal transmitted tester data packet signal powers; and receiving, with the tester from the DUT, a first DUT data packet signal including a first plurality of DUT data packets with alternating portions related to respective ones of the alternating portions of the first plurality of tester data packets.

DETAILED DESCRIPTION

Figure 1:
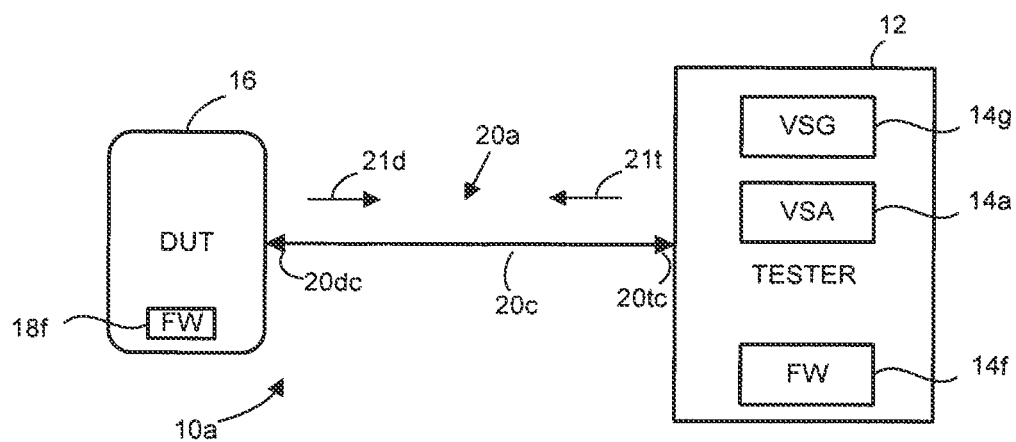
FIG. 1 depicts a typical testing environment for a radio frequency (RF) data packet signal transceiver device under test (DUT) in a conductive, or wired, environment.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies (e.g., IEEE 802.11a/b/g/n/ac, 3GPP LTE, and Bluetooth). The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

As discussed in more detail below, in accordance with the presently claimed invention, a tester determines where in a test sequence a DUT is currently executing or performing, thereby allowing the tester to control and coordinate subsequent test steps without performing or otherwise requiring explicit synchronization communications with the DUT. For example, simple driver software can be programmed into the DUT (alternatively, firmware can be embedded) to cause the DUT to perform predetermined patterns of signal transmissions and reception steps, which can be recognized and used by the tester to coordinate execution of transmit (TX) and receive (RX) test sequences.

Accordingly, the DUT need not be fitted or otherwise provided with special firmware specially developed by the DUT firmware provider (e.g., the chipset vendor) with explicit synchronization processes or procedures between test steps. Instead, test execution can be implemented by using simple driver commands that are capable of being executed by the DUT without being explicitly synchronized with the tester. This allows benefits of synchronized test execution to be realized, similar to use of predetermined test flows, but without requiring the DUT and tester to engage in explicit synchronization communications, and without requiring special driver development. In effect, the tester adapts to the execution of TX and RX operations by the DUT.

As is well known, testing of a wireless DUT typically includes testing of the DUT receiving and transmitting subsystems. The tester sends a prescribed sequence of test data packet signals to the DUT, using different frequencies, power levels, or signal modulation types, or combinations of two or more of these, to determine whether the DUT receiving subsystem is operating properly. Similarly, the DUT will send DUT data packet signals at a variety of frequencies, power levels, or modulation types, or combinations of two or more of these, to determine if the DUT transmitting subsystem is operating properly.

In conventional testing environments, the overall testing time includes time to set up the test, time spent sending test data packet signals, and time spent sending non-test control signals (e.g., typically from the tester to the DUT). In accordance with the presently claimed invention, non-test communications and set up time are minimized to reduce test time and cost. As a result, benefits previously realized by execution of predetermined sequences, shared by the DUT and tester, can be realized without requiring explicit synchronization between the tester and DUT, or having the DUT share details of a predetermined test flow with the tester. For example, simply knowing the order of the tests to be conducted may be sufficient. Further, precise or repeatable test sequences need not be executed, thereby enabling more flexibility in terms of accuracy of test sequence timing or data packet counts that conventional test methods typically rely upon.

Referring to FIG. 1, a typical testing environment 10a includes a tester 12 and a DUT 16, with test data packet signals 21t and DUT data packet signals 21d exchanged as RF signals conveyed between the tester 12 and DUT 16 via a conductive signal path, typically in the form of co-axial RF cable 20c and RF signal connectors 20tc, 20dc. As noted above, the tester typically includes a signal source 14g (e.g., a VSG) and a signal analyzer 14a (e.g., a VSA). Also, as discussed above, the tester 12 and DUT 16 include pre-loaded information regarding predetermined test sequences, typically embodied in firmware 14f within the tester 12 and firmware 18f within the DUT 16. As further noted above, the details within this firmware 14f, 18f about the predetermined test flows typically requires some form of explicit synchronization between the tester 12 and DUT 16, typically via the data packet signals 21t, 21d.

Figure 2:
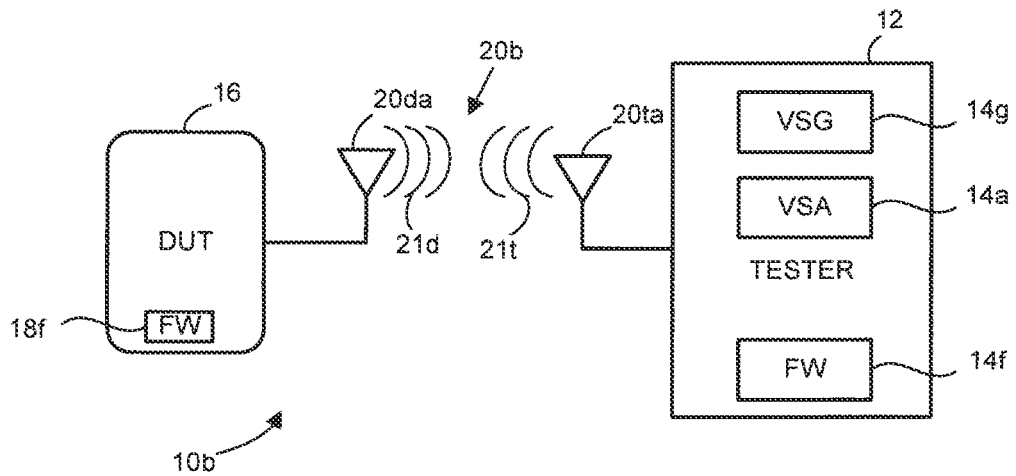
FIG. 2 depicts a typical testing environment for a radio frequency (RF) data packet signal transceiver device under test (DUT) in a radiative, or wireless, environment.

Referring to FIG. 2, an alternative testing environment 10b uses a wireless signal path 20b via which the test data packet signals 21t and DUT data packet signals 21d are communicated via respective antenna systems 20ta, 20da of the tester 12 and DUT 16.

Figure 3:
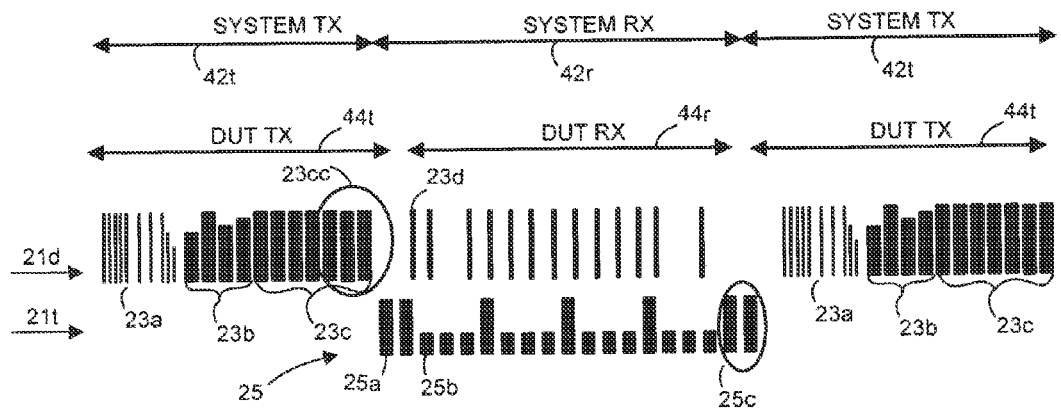
FIG. 3 depicts data packet signal interactions between a tester and DUT in accordance with one embodiment of the presently claimed invention.

Referring to FIG. 3, in accordance with one embodiment of the presently claimed invention, successive sequences of system transmit 42t and receive 42r operations with corresponding DUT transmit 44t and receive 44r sequences occur as shown. Initially, the DUT is transmitting a test data packet signal 21d. As will be readily appreciated, initial DUT signals 23a begin this sequence followed by initial, or early, DUT data packets 23b having varying signal power levels due to the power settling characteristics of the DUT transmitter circuitry, followed by later DUT data packets 23c having more consistent data packet power levels which have settled at the intended nominal data packet signal power. Upon, or following, cessation of these DUT data packets 23c, which is detected by the tester, the last several (e.g., three) data packets 23cc, which have been received and captured by the tester (e.g., in a memory circuit such as a first-in, first-out (FIFO) or shift register circuit) are retained by the tester for analysis.

The next operation is a DUT receive test sequence 44r. Accordingly, the tester begins transmitting test data packets 21t in response to which the DUT transmits responsive data packets (e.g., acknowledgement or ACK) data packets. The tester initially transmits a higher power data packet 25a to initiate responsive data packets 23d from the DUT. Reception by the tester of these responsive data packets 23d from the DUT indicate that DUT is in receive mode. The tester sends a sequence of test data packet signals 25 at a predetermined frequency and power level 25b and begins counting responsive data packets 23d from the DUT that are received, for purposes of determining packet error rate (PER).

In this example, following every third test data packet signal 25b, the tester sends a higher powered data packet 25a having a nominal signal power level (defined by the power distribution of the data packet signal components in the presence of noise) greater than a power threshold sufficient to ensure that the DUT returns an ACK and thereby confirm that the DUT is still in receive mode (as indicated by reception of a responsive data packet 23d). For purposes of the PER computation, such higher powered test data packet and its corresponding responsive data packet are not included in the PER computation. Ultimately, higher powered data packet signals 25c will not result in responsive data packets 23d. This is indicative of the DUT now no longer being in receive mode. In this example, two final higher powered data packet signals 25c are sent, with the second data packet being transmitted to further ensure that the first higher powered data packet was not otherwise missed by the DUT.

Figure 4:
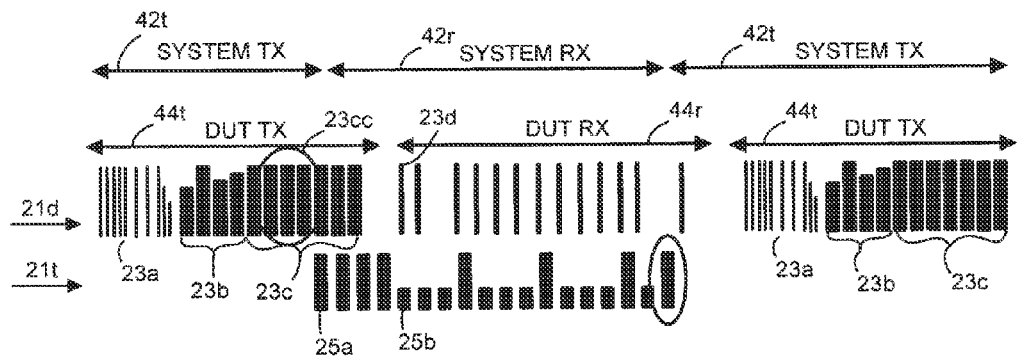
FIG. 4 depicts data packet signal interactions between a tester and DUT in accordance with another embodiment of the presently claimed invention.

Referring to FIG. 4, in accordance with another embodiment of the presently claimed invention, power settling of the DUT data packets 23c is detected (e.g., as described in U.S. patent application Ser. No. 14/082,378, the disclosure of which is incorporated herein by reference) and earlier power-settled data packets 23cc are captured and retained for analysis, rather than waiting until the cessation of the DUT data packets 21d. As discussed above, the DUT then transitions to receive mode. Since earlier DUT data packets have been captured for analysis, this enables the tester to begin its transition to transmit mode for DUT receive testing earlier than in the previous example. This further enables the tester to begin transmitting the higher powered test data packets 25a to initiate transmission of responsive data packets 23d from the DUT sooner. Also as before, a predefined number of test data packets 25b at lower data packet power levels for computing PER are transmitted in an alternating manner with periodic higher powered data packets 25a to confirm that the DUT is still in receive mode. As a result, the tester is able to complete its PER testing earlier and begin its transition to receive mode for DUT transmitter testing sooner. This is advantageous when the DUT uses a fast driver with sequence capability causing the DUT to switch from receive to transmit mode quickly.

Figure 5:
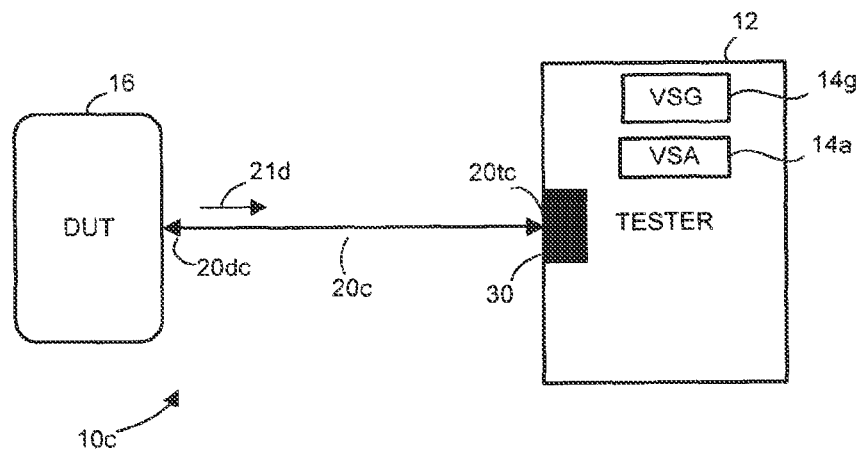
FIG. 5 depicts an alternative testing environment in which a power meter, or power sensing, device or subsystem is included as part of the tester.

Referring to FIG. 5, the testing environment 10c can include power sensing or measurement capability 30 within the tester 12, or alternatively, as an external power measurement subsystem at the input to the tester. Using a power meter 30 to sample the incoming DUT data packet signals 21d is advantageous in that it can monitor a wide range of frequencies compared to the more narrow bandwidth capabilities of a typical VSA 14a. As a result, the power meter 30 can detect if the DUT 16 transitions to transmit mode or receive mode before the tester 12 may otherwise become aware of such transition.

Figure 6:
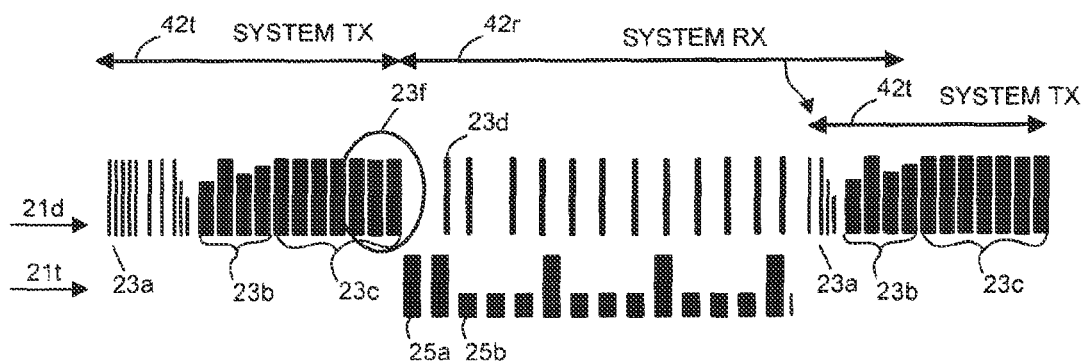
FIG. 6 depicts data packet signal interactions between a tester and DUT in accordance with another embodiment of the presently claimed invention.

Referring to FIG. 6, use of such power measurement capability is helpful where the tester is still executing a receive test (during a DUT receive sequence 44r) when the power meter detects that the DUT begins transmitting another DUT data packet signal with DUT data packets 23a, 23b, 23c as part of another DUT transmit sequence 44t, and can cause the ongoing receive operation to be interrupted and provide DUT data packet power information sufficient to inform the tester to transition to the next operation. This will save time that would otherwise have been spent waiting until a failure to receive a responsive data packet 23d from the DUT in response to a higher powered test data packet (or two higher powered data packets) intended to confirm that the DUT is still operating in receive mode.

Such use of a power meter 30 can further ensure that the tester will keep up with changes in DUT operation mode transitions even if the transmit frequency of the DUT has changed. Of course, even in the absence of a power meter 30, the tester can still detect such a frequency change, as before, when one or more higher powered test data packets 25a fail to produce responsive data packets from the DUT.

Figure 7:
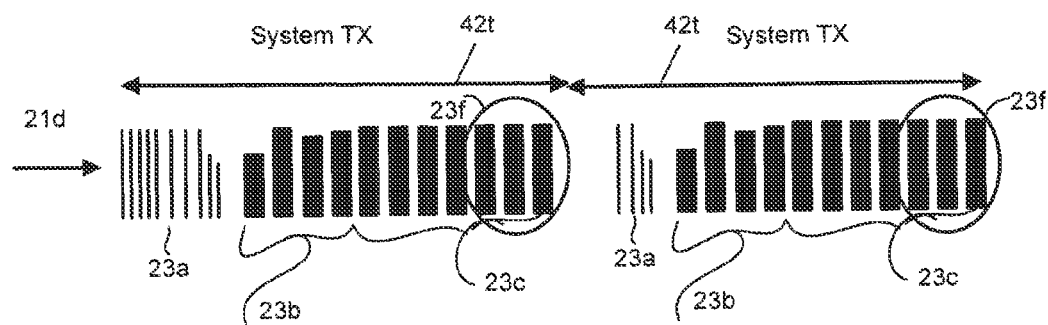
FIG. 7 depicts data packet signal interactions between a tester and DUT in accordance with another embodiment of the presently claimed invention.

Referring to FIG. 7, in accordance with another embodiment of the presently claimed invention, a flow including a sequence of multiple sets of DUT transmit data packets can be detected, as before, by detecting an end of a first sequence of data packets 23c (in response to which sample data packets 23f are retained for analysis), or by detecting power settling as discussed above.

Figure 8:
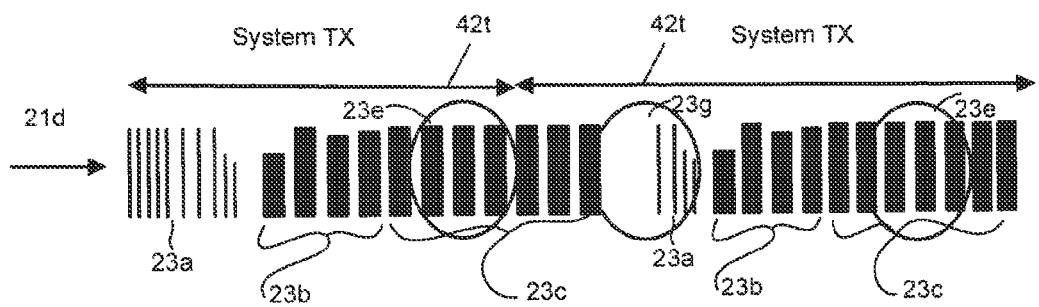
FIG. 8 depicts data packet signal interactions between a tester and DUT in accordance with another embodiment of the presently claimed invention.

Referring to FIG. 8, in accordance with another embodiment of the presently claimed invention, as discussed above, power settling by the DUT data packet 23c can be detected to enable capturing of earlier data packet 23e for analysis. Cessation of the DUT data packets in the first sequence can be determined by the tester by detecting the significant drop in DUT data packet power level occurring at the end 23g of the data packet sequence. Alternatively, a change in the DUT data packets in the first sequence can be determined by the tester by detecting a change in the type or duty cycle of the DUT data packets being transmitted.

Figure 9:
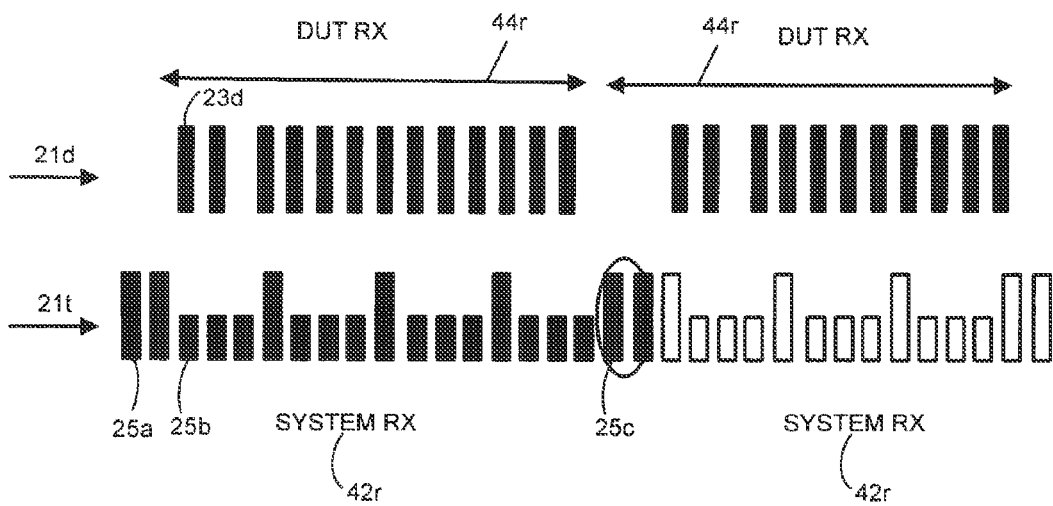
FIG. 9 depicts data packet signal interactions between a tester and DUT in accordance with another embodiment of the presently claimed invention.

Referring to FIG. 9, in accordance with another embodiment of the presently claimed invention, the DUT testing includes a series of receive test sequences 44r, e.g., at different signal bandwidths or frequencies. For example, in the first sequence, the tester may be sending test data packet signals at a first frequency F1 or bandwidth, while during the second sequence the tester sends test data packet signals at a second frequency F2 or bandwidth. The transition between the RX sequences is detected by the tester sending the intervening one or more higher powered data packet signals intended to confirm that the DUT is still operating in receive mode, in response to which no DUT data packets 23d are returned, thereby indicating that the DUT has transitioned to a mode in which tester data packets at a different frequency or bandwidth are expected.

Figure 10:
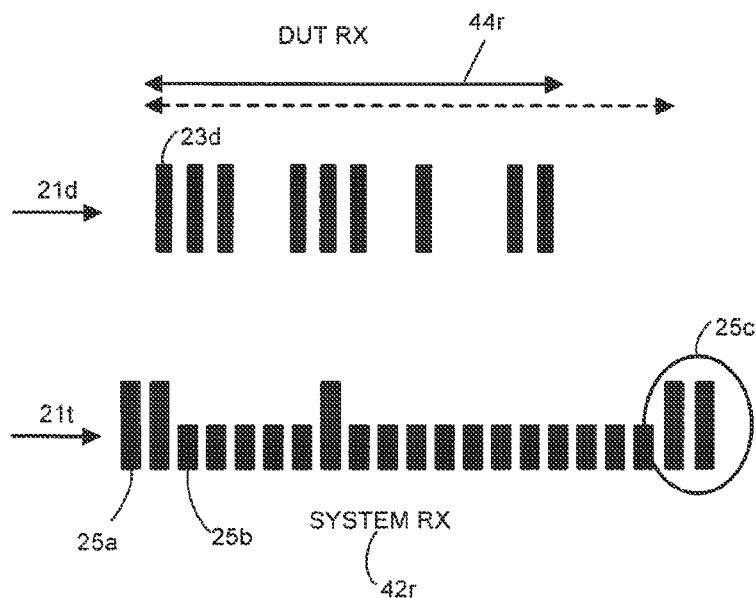
FIG. 10 depicts data packet signal interactions between a tester and DUT in accordance with another embodiment of the presently claimed invention.

Referring to FIG. 10, in accordance with another embodiment of the presently claimed invention, rather than transmitting intervening higher powered data packets 25a, the tester only send higher powered data packets after some number of consecutive lower powered data packets 25b have not produced responsive data packets 23d from the DUT. For example, as shown here, in the event that three consecutive lower powered data packets 25b have not produced responsive data packets 23d from the DUT, a higher powered data packet 25a is transmitted. If such higher powered test data packet results in a responsive data packet 23d, the DUT receiver is considered still active, and receive testing continues. (In this case, the missing responsive data packets from the DUT would be included for purposes of computing the PER.) Subsequently, responsive data packet 23d from the DUT are not received, in response to which the tester again sends one or more higher powered test data packets 25c. Receiving no responsive data packets from the DUT, the tester then concludes that the DUT is no longer in receive mode, and the PER can be determined as of the most recent lower powered test data packet resulting in a responsive data packet from the DUT. For example, in this case, the PER would be calculated as including six missed test data packets out of 12 lower powered test data packets 25b.

A DUT driver algorithm for supporting methods such as those discussed herein could be as simple as "start TX @ freq1, wait, stop TX, start RX at freq1, wait, stop RX" and the like. Even in a case where one must retrieve data from the DUT (e.g., as in Bluetooth bit-error-rate test, BluetoothLE packet-error-rate test, or WiFi RSSI), retrieval and storage of the desired value can be performed before moving on to the next operation, or be retrieved following completion of testing. (While performing a received signal strength indicator (RSSI) measurement can be complicated by the use of higher powered packets as discussed above, the test method depicted in FIG. 10 can be effective.) For example, the DUT driver algorithm could be "start RX@ freq1, wait, retrieve RSSI, retrieve BER, stop RX, store results . . . ." More advanced DUT control sequences can also be supported, such as a sequence operation as described in U.S. Pat. No. 8,391,160 or U.S. patent application Ser. No. 14/147,159, the disclosures of which are incorporated herein by reference.

Accordingly, the presently claimed invention eliminates the need for the DUT to be cognizant of the predetermined test flow details, as well as a need for the DUT and tester to engage in explicit synchronization interactions. Rather, the tester can identify the state of the DUT execution of its test flow, and adapt accordingly. As a result, benefits of predetermined test flow execution are realized but with less complexity by having the tester control and coordinate test execution based on its determination of implicit synchronization test points.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for testing a radio frequency (RF) data packet signal transceiver device under test (DUT) including detecting a transition between RF data packet signal transmission and reception by said DUT, comprising:
   receiving, with a tester from a DUT, a first DUT data packet signal including earlier and later portions of a first plurality of DUT data packets;
   capturing, with said tester, one or more DUT data packets among said later portion of said first plurality of DUT data packets, followed by
   transmitting, from said tester, a tester data packet signal including a plurality of tester data packets with alternating portions having respective durations of mutually higher and lower nominal transmitted tester data packet signal powers, and receiving, with said tester from said DUT, a second DUT data packet signal including a second plurality of DUT data packets with alternating portions related to respective ones of said alternating portions of said plurality of tester data packets; and terminating said transmitting of said tester data packet signal, followed by receiving, with said tester from said DUT, a third DUT data packet signal including a third plurality of DUT data packets;

wherein said first and second pluralities of DUT data packets occupy first and second transmit time intervals, respectively, separated by a receive time interval occupied by said plurality of tester data packets.

2. The method of claim 1, wherein:

said earlier and later portions of a first plurality of DUT data packets include earlier and later portions of a plurality of respective DUT data packet power levels, respectively;

said earlier portion of said plurality of respective DUT data packet power levels includes maximum and minimum DUT data packet power levels defining a first power level difference; and said later portion of said plurality of respective DUT data packet power levels includes maximum and minimum DUT data packet power levels defining a second power level difference less than said first power level difference.

3. The method of claim 2, wherein:

said later portion of said first plurality of DUT data packets comprises a first sub-portion followed by a second sub-portion; and said capturing, with said tester, one or more DUT data packets among said later portion of said first plurality of DUT data packets comprises capturing one or more DUT data packets among said first sub-portion.

4. The method of claim 3, further comprising measuring said plurality of respective DUT data packet power levels to detect said first and second power level differences, and wherein said capturing one or more DUT data packets among said first sub-portion comprises capturing said one or more DUT data packets in response to said detection of said second power level difference.

5. The method of claim 1, further comprising detecting a cessation of said first DUT data packet signal, and wherein said capturing, with said tester, one or more DUT data packets among said later portion of said first plurality of DUT data packets comprises capturing said one or more DUT data packets in response to said detection of said cessation of said first DUT data packet signal.

6. The method of claim 1, wherein:

said later portion of said first plurality of DUT data packets comprises a first sub-portion followed by a second sub-portion; and said capturing, with said tester, one or more DUT data packets among said later portion of said first plurality of DUT data packets comprises capturing one or more DUT data packets among said second sub-portion.

7. The method of claim 1, wherein each one of a portion of said second plurality of DUT data packets comprises a DUT data packet transmitted by said DUT in response to reception by said DUT of a respective one of a portion of said plurality of tester data packets.

8. The method of claim 1, further comprising, following said capturing, with said tester, one or more DUT data packets among said later portion of said first plurality of DUT data packets, and prior to said transmitting, from said tester, a tester data packet signal including a plurality of tester data packets with alternating portions having respective durations of mutually higher and lower nominal transmitted tester data packet signal powers, detecting one of
a cessation of said first DUT data packet signal, or
a power-settling of said first DUT data packet signal.

9. The method of claim 1, further comprising, following said receiving, with said tester from said DUT, a second DUT data packet signal, and prior to said terminating said transmitting of said tester data packet signal, detecting a cessation of said second DUT data packet signal.

10. The method of claim 1, further comprising, following said receiving, with said tester from said DUT, a second DUT data packet signal, and prior to said terminating said transmitting of said tester data packet signal, detecting a transmission of said third DUT data packet signal.

11. The method of claim 1, wherein each one of a portion of said second plurality of DUT data packets comprises a DUT data packet transmitted by said DUT in response to reception by said DUT of a respective one of a portion of said plurality of tester data packets having a nominal transmitted tester data packet signal power greater than a threshold power, and further comprising, following said receiving, with said tester from said DUT, a second DUT data packet signal, and prior to said terminating said transmitting of said tester data packet signal, detecting a cessation of said second DUT data packet signal following transmission, from said tester, of one or more tester data packets having nominal transmitted tester data packet signal powers greater than said threshold power.

12. A method for testing a radio frequency (RF) data packet signal transceiver device under test (DUT) including detecting a transition between RF data packet signal transmission operations by said DUT, comprising:

receiving, with a tester from a DUT, a first DUT data packet signal including earlier and later portions of a first plurality of DUT data packets;

capturing, with said tester, one or more DUT data packets among said later portion of said first plurality of DUT data packets;

receiving, with said tester from said DUT, a second DUT data packet signal subsequent to said first DUT data packet signal and including earlier and later portions of a second plurality of DUT data packets; and capturing, with said tester, one or more DUT data packets among said later portion of said second plurality of DUT data packets;

wherein said first and second pluralities of DUT data packets occupy first and second time intervals, respectively, separated by an intervening time interval occupied by no data packets.

13. The method of claim 12, wherein:
said earlier and later portions of a first plurality of DUT data packets include earlier and later portions of a plurality of respective DUT data packet power levels, respectively;
said earlier portion of said plurality of respective DUT data packet power levels includes maximum and minimum DUT data packet power levels defining a first power level difference; and
said later portion of said plurality of respective DUT data packet power levels includes maximum and minimum DUT data packet power levels defining a second power level difference less than said first power level difference.

14. The method of claim 13, wherein:
said later portion of said first plurality of DUT data packets comprises a first sub-portion followed by a second sub-portion; and
said capturing, with said tester, one or more DUT data packets among said later portion of said first plurality of DUT data packets comprises capturing one or more DUT data packets among said first sub-portion.

15. The method of claim 12, further comprising detecting a cessation of said first DUT data packet signal, and wherein said capturing, with said tester, one or more DUT data packets among said later portion of said first plurality of DUT data packets comprises capturing said one or more DUT data packets in response to said detection of said cessation of said first DUT data packet signal.

16. The method of claim 12, wherein:
said later portion of said first plurality of DUT data packets comprises a first sub-portion followed by a second sub-portion; and
said capturing, with said tester, one or more DUT data packets among said later portion of said first plurality of DUT data packets comprises capturing one or more DUT data packets among said second sub-portion.

17. The method of claim 12, further comprising,
following said capturing, with said tester, one or more DUT data packets among said later portion of said first plurality of DUT data packets, and
prior to said receiving, with said tester from said DUT, a second DUT data packet signal subsequent to said first DUT data packet signal,
detecting a cessation of said first DUT data packet signal.

18. A method for testing a radio frequency (RF) data packet signal transceiver device under test (DUT) including detecting a transition between RF data packet signal reception operations by said DUT, comprising:
transmitting, from said tester, a first tester data packet signal including a first plurality of tester data packets with alternating portions having respective durations of mutually higher and lower nominal transmitted tester data packet signal powers;
receiving, with said tester from a DUT, a first DUT data packet signal including a first plurality of DUT data packets with alternating portions related to respective ones of said alternating portions of said first plurality of tester data packets;
detecting a cessation of said first DUT data packet signal, followed by terminating said transmitting of said first tester data packet signal;
transmitting, from said tester, a second tester data packet signal subsequent to said first tester data packet signal and including a second plurality of tester data packets with alternating portions having respective durations of mutually higher and lower nominal transmitted tester data packet signal powers; and
receiving, with said tester from said DUT, a second DUT data packet signal including a second plurality of DUT data packets with alternating portions related to respective ones of said alternating portions of said second plurality of tester data packets;
wherein said first plurality of tester data packets and said first plurality of DUT data packets occupy a first time interval, said second plurality of tester data packets and said second plurality of DUT data packets occupy a second time interval, and said first and second time intervals are adjacent.

19. The method of claim 18, wherein said detecting a cessation of said receiving said first DUT data packet signal comprises detecting a cessation of receiving, with said tester from said DUT, one or more of said first plurality of DUT data packets related to a corresponding one or more of said first plurality of tester data packets having said higher nominal transmitted tester data packet signal powers.

20. The method of claim 18, wherein:
each one of a portion of said first plurality of DUT data packets comprises a DUT data packet transmitted by said DUT in response to reception by said DUT of a respective one of a portion of said first plurality of tester data packets; and
each one of a portion of said second plurality of DUT data packets comprises a DUT data packet transmitted by said DUT in response to reception by said DUT of a respective one of a portion of said second plurality of tester data packets.

21. The method of claim 18, wherein:
each one of said first plurality of DUT data packets comprises a DUT data packet transmitted by said DUT in response to reception by said DUT of a respective one of said first plurality of tester data packets having a nominal transmitted tester data packet signal power greater than a threshold power; and
said detecting a cessation of said first DUT data packet signal comprises detecting a cessation of said first DUT data packet signal following transmission, from said tester, of one or more tester data packets having nominal transmitted tester data packet signal powers greater than said threshold power.

* * * * *